(12) United States Patent
Jung et al.

(10) Patent No.: US 7,796,486 B2
(45) Date of Patent: Sep. 14, 2010

(54) OPTICAL INFORMATION REPRODUCING APPARATUS AND OPTICAL INFORMATION RECORDING APPARATUS USING HOLOGRAPHY

(75) Inventors: Kyu-Il Jung, Seoul (KR); Jin-Bae Moon, Seoul (KR); Kun-Yul Kim, Gunpo-si (KR)

(73) Assignee: Daewoo Electronics Corp., Seoul (KR)

( * ) Notice: Subject to any disclaimer, the term of this patent is extended or adjusted under 35 U.S.C. 154(b) by 961 days.

(21) Appl. No.: 11/486,363

(22) Filed: Jul. 13, 2006

(65) Prior Publication Data

US 2007/0291617 A1    Dec. 20, 2007

(30) Foreign Application Priority Data

Apr. 25, 2006   (KR) .................... 10-2006-0037387

(51) Int. Cl.
*G11B 7/00* (2006.01)
*G11B 7/135* (2006.01)

(52) U.S. Cl. ................... 369/103; 369/112.23
(58) Field of Classification Search .......... 369/103, 369/112.23
See application file for complete search history.

(56) References Cited

U.S. PATENT DOCUMENTS 5,331,621 A * 7/1994 Miyake et al. ........... 369/112.1
2005/0083799 A1 * 4/2005 Horimai .................. 369/44.28
2005/0195722 A1 * 9/2005 Tsukamoto et al. ......... 369/103
2005/0254108 A1   11/2005 Chuang
2005/0270609 A1   12/2005 Chuang

FOREIGN PATENT DOCUMENTS

JP   2005043687 A   2/2005

* cited by examiner

*Primary Examiner*—Daniell L Negrón
*Assistant Examiner*—Nicholas Lee

(57) ABSTRACT

An optical information reproducing apparatus using holography is provided. The holographic optical information reproducing apparatus includes an objective lens irradiating a reference beam to a predetermined position on a recording medium and receiving a reproducing beam reproduced from the recording medium, an optical information detector detecting the reproducing beam passing through the objective lens, a driving unit changing a distance between the optical information detector and the objective lens and an image adjusting unit adjusting magnification and a focus between an output image resulting from the reproducing beam passing through the objective lens and a detected image detected by the optical information detector with a variation in distance between the optical information detector and the objective lens.

11 Claims, 6 Drawing Sheets

OPTICAL INFORMATION REPRODUCING APPARATUS AND OPTICAL INFORMATION RECORDING APPARATUS USING HOLOGRAPHY

BACKGROUND

1. Technical Field

The present invention relates to an optical information reproducing apparatus and an optical information recording apparatus using holography.

2. Related Art

In recording information onto a recording medium using holography, an information beam carrying image information and a recording-specific reference beam overlap each other in the recording medium and an interference pattern generated thereby is written onto the recording medium. For reproducing the recorded information, a reproducing-specific reference beam is irradiated onto the recording medium so as to reproduce image information by diffraction in the interference pattern.

Volume holography has been developed for achieving high density optical recording and high data transmission rate. The volume holography is a method in which the interference patterns are written tree-dimensionally by actively utilizing the thickness direction of the recoding medium. Since the volume holography can employ a parallel signal processing operation for input and output of data, it is possible to basically enhance a data transmission rate in comparison with a compact disc (CD) and a digital versatile disc (DVD). In addition, it is possible to drastically enhance the recording density by using a multiplexing technique.

The recording medium can employ a disc-type medium such as a CD, a DVD and the like. The recording medium rotates about a fixed axis, and a plurality of tracks is formed from the center thereof.

A holographic optical information processing apparatus includes an optical pickup to drive an objective lens through rotating the recording medium. The optical pickup performs a focus servo and tracking servo by driving the objective lens.

U.S. Pat. No. 6,807,671 discloses an optical pickup having a light source, a spatial light modulator and an objective lens. The optical pickup is driven to record optical information in the recording medium or reproduce the optical information from the recording medium.

Generally, an optical pickup moves to a predetermined recording position or reproducing position of the recording medium so as to process the optical information by track. When operating the optical pick, a vibration is externally or internally caused between the objective lens and an other optical system. Even when the vibration of the optical pick is smaller in comparison with that of the other part of the optical information processing apparatuses, the vibration has a large influence on recording/reproducing the optical information. At the time of recording the optical information, the small vibration of the optical system in the optical pickup can causes a large variation in interference pattern, whereby the optical information cannot be accurately recorded. At the time of reproducing the optical information, when the reproducing-specific reference beam is shifted, the interference pattern can be changed, whereby the optical information cannot be accurately reproduced.

The optical pickup of the holographic optical information processing apparatus includes relatively heavy and large devices such as a spatial light modulator and a charge-coupled device, in addition to an optical system. Accordingly, it is not easy to reduce the vibration caused by the operation of the optical pickup and to improve the data transmission rate.

SUMMARY

According to an aspect of the invention, there is provided an optical information reproducing apparatus using holography. The holographic optical information reproducing apparatus includes an objective lens irradiating a reference beam to a predetermined position on a recording medium and receiving a reproducing beam reproduced from the recording medium, an optical information detector detecting the reproducing beam passing through the objective lens, a driving unit changing a distance between the optical information detector and the objective lens and an image adjusting unit adjusting magnification and a focus between an output image resulting from the reproducing beam passing through the objective lens and a detected image detected by the optical information detector with a variation in distance between the optical information detector and the objective lens.

According to another aspect of the invention, there is provided an optical information reproducing apparatus having an optical pickup irradiating a reference beam to a recording medium an detecting a reproducing beam reproduced from the recording medium. The optical pickup comprises a moving unit having an objective lens which moves to a predetermined position on the recording medium and irradiates the reference beam to the recording medium, a fixed unit having an optical information detector detecting the reproducing beam and an image adjusting unit adjusting magnification and a focus of a detected image detected by the optical information detector.

According to still another aspect of the invention, there is provided a holographic optical information recording apparatus for recording an interference pattern of a reference beam and an information beam in a recording medium. The apparatus comprises a light source emitting light, an information beam generator generating the information beam from the emitted beam, a reference beam generator generating the reference beam from the emitted beam; an objective lens irradiating the information beam to a predetermined position on the recording medium, a driving unit changing a distance between the information beam generator and the objective lens and an image adjusting unit adjusting magnification and a focus between an incident image of the objective lens and an image at a position of the information beam generator with a variation in distance between the information beam generator and the objective lens.

According to still another aspect of the invention, there is provided a holographic optical information recording apparatus having an optical pickup recording an interference pattern of a reference beam and an information beam in a recording medium. The optical pickup comprises a moving unit having an objective lens which moves to a predetermined position on the recording medium and irradiates the information beam to the recording medium, a fixed unit having an having an information beam generator generating the information beam and an image adjusting unit adjusting magnification and a focus between an image at a position of the information beam generator and an incident image of the objective lens.

BRIEF DESCRIPTION OF THE DRAWINGS

The above and other aspects and advantages of the present invention will become more apparent by describing in detail exemplary embodiments, taken in conjunction with the accompanying drawings in which.

DESCRIPTION OF EXEMPLARY EMBODIMENTS

Figure 1:
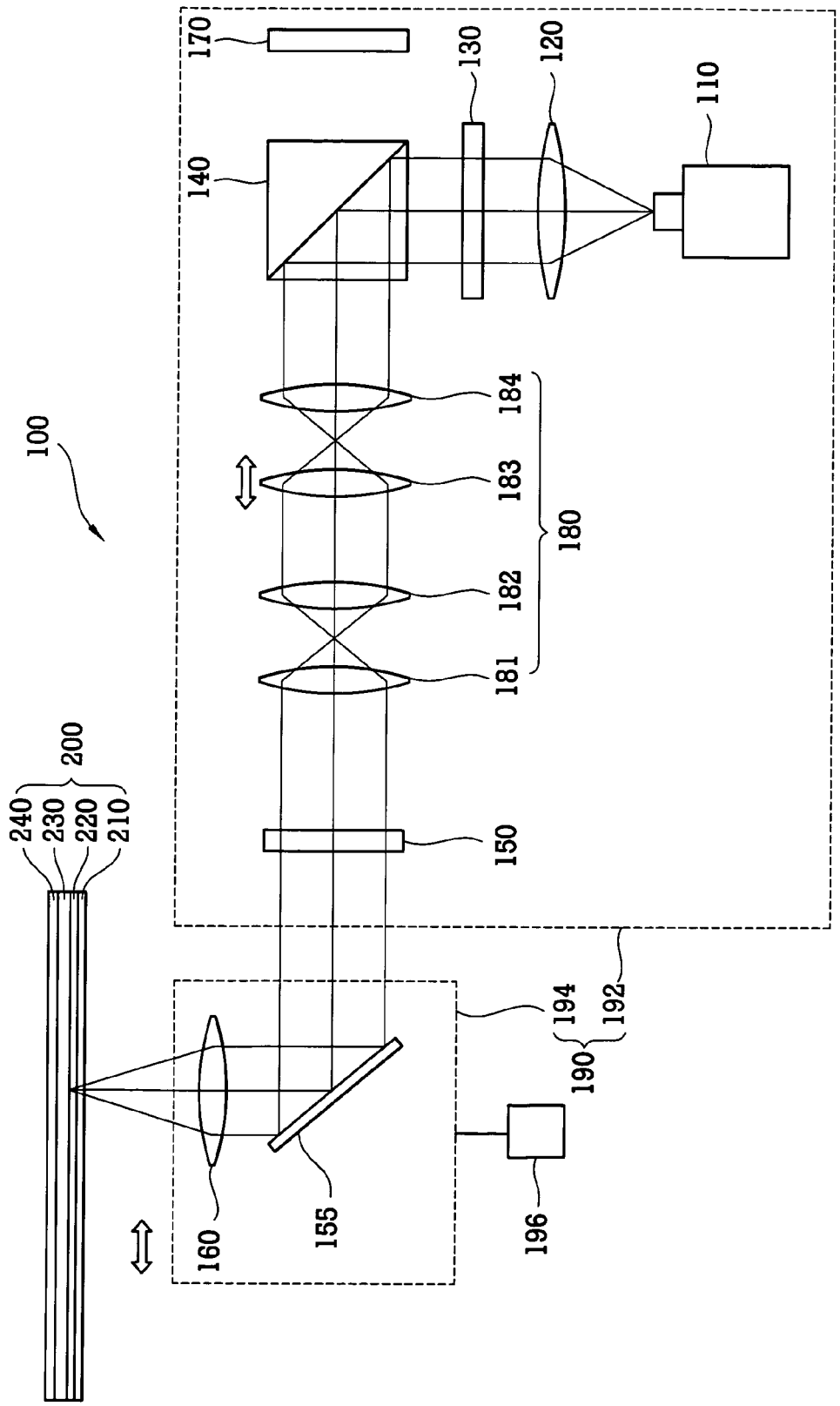
FIG. 1 is a schematic diagram illustrating an optical path for recording optical information in an optical information recording and reproducing apparatus.

Hereinafter, exemplary embodiments of the present invention will be described with reference to the attached drawings. In the following description, like elements are denoted by like reference numerals.

FIG. 1 is a schematic diagram illustrating an optical path for recording optical information in an optical information recording and reproducing apparatus.

Referring to FIG. 1, the optical information recording and reproducing apparatus 100 includes an optical pickup 190 irradiating a reference beam and an information beam to a recording medium 200 and receiving a reproducing beam from the recording medium 200. The optical pickup 190 can include a collimator lens 120, a light modulator 130, a polarizing beam splitter 140, a quarter-wavelength plate 150, a reflecting mirror 155, an objective lens 160, an optical information detector 170, and an image adjusting unit 180.

A light source 110 can employ a semiconductor laser generating a coherent laser beam linearly polarized. Since a small wavelength is effective for high-density recording, the semiconductor laser can be a blue laser or green laser. The collimator lens 120 converts a beam emitted from the light source 110 into a substantially parallel beam.

The light modulator 130 can include a plurality of pixels arranged in a shape of grids and modulate the phase or intensity of an incident beam. A liquid crystal display (LCD) device can be used as the light modulator 130.

The information beam is a beam carrying optical information to be recorded. The information beam is obtained by modulating the beam emitted from the light source 110 at the light modulator 130. The information beam is modulated with an optical information pattern. The reference beam is a beam for forming an interference pattern onto the recording medium (or hologram) by interfering with the information beam. The reference beam is obtained by modulating the beam emitted from the light source 110 at the light modulator 130. The reference beam is modulated with a reference pattern. A multiplexing can be performed by modulating the reference beam with different reference patterns.

In one exemplary embodiment, the light modulator 130 serves as an information beam generator (not shown) and a reference beam generator (not shown). The information beam generator is integrated with the reference beam generator are integrated. In another exemplary embodiment, the information beam generator and the reference beam generator may be provided individually. For example, two light modulators may be used as the information beam generator and the reference beam generator.

The information beam and the reference beam generated from the light modulator 130 travel to the polarizing beam splitter 140. The polarizing beam splitter 140 can reflect or transmit a linearly polarized beam. In the exemplary embodiment, the polarizing beam splitter 140 reflects a P polarized beam and transmits an S polarized beam perpendicular to the P polarized beam. In another exemplary embodiment, the polarizing beam splitter 140 can reflect an S polarized beam and transmit a P polarized beam. The P polarized information beam and reference beam are reflected by the polarizing beam splitter 140 and are irradiated to the recording medium 200 after sequentially passing through the image adjusting unit 180, the quarter-wavelength plate 150, the reflecting mirror 155 and the objective lens 160.

The quarter-wavelength plate 150 can change an optical path difference of the linearly polarized beams by ¼ wavelength. The P polarized beam is changed to a circularly polarized beam by passing the quarter-wavelength plate 150. Conversely the circularly polarized beam is changed to the S polarized beam by passing the quarter-wavelength plate 150.

The reflecting mirror 155 can be an optical device to guide the reference beam and the information light to the objective lens 160. And the reflecting mirror 155 can guide a reproducing beam to the optical information detector 170.

The objective lens 160 can converge the reference beam and the information beam to a predetermined position on the recording medium 200. Further, A reproducing beam reproduced from the recording medium 200 passes through the objective lens 160.

The optical information detector 170 detects optical information from the reproducing beam. The optical information detector 170 is a light receiving device in which a plurality of light receiving elements is arranged in a shape of grids. The light receiving device may be a charge-coupled device (CCD) or a complementary metal-oxide semiconductor (CMOS) device.

The recording medium 200 has a disc shape, and a transparent layer 210, a recording layer 220, and a reflecting layer 230 are sequentially stacked on a substrate 240. The reference beam and the information beam are incident through the transparent layer 210. The recording layer 220 is made of a hologram material of which optical characteristics such as a refraction index, a dielectric constant, and a reflectance vary with a variation in intensity of incident beams. For example, the recording layer 220 may be made of HRF-600 (product code) made by Dupont Co. The reflecting layer 230 may be made of a material such as aluminum reflecting the reference beam and the information beam. An address servo area (not shown) or a data area (not shown) may be formed in the reflecting layer 230.

An optical path for recording optical information is now described with reference to FIG. 1.

The beam emitted from the light source 110 is converted into a parallel beam by the collimate lens 120 and is then incident on the light modulator 130.

The light modulator 130 loads a predetermined pattern into the incident beam. The light modulator 130, in which an optical information pattern is disposed at the central portion thereof and a reference pattern is disposed around the optical information pattern, generates the information beam and the reference beam simultaneously. The arrangement of the optical information pattern and the reference pattern can be changed by those skilled in the art.

The reference beam and the information beam can be P polarized beams. The reference beam and the information beam are reflected by the polarizing beam splitter 140, pass through the image adjusting unit 180, and are incident on the quarter-wavelength plate 150. The P polarized reference beam and information beam are converted into circularly polarized beams by passing the quarter-wavelength plate 150.

The reference beam and the information beam are reflected to the objective lens 160 by the reflecting mirror 155. The objective lens 160 converges the reference beam and the information beam to a predetermined position on the recording medium 200. The reference beam and the information beam interfere with each other on the recording medium 200 and an interference pattern therebetween is recorded in the recording layer 220.

The operation of reproducing optical information is basically similar to the operation shown in FIG. 1. However, only the reference beam is modulated by the light modulator 130 when reproducing the optical information. In this case, the light modulator 130 only serves as the reference beam generator.

The beam emitted from the light source 110 is modulated with only the reference pattern by the light modulator 130, thereby generating the reference beam. The reference beam is incident on the recording medium 200 through the polarizing beam splitter 140 and the objective lens 160. When the reference beam is incident on the recording medium 200, the reference beam is diffracted by the interference pattern recorded in the recording layer 220, thereby generating the reproducing beam containing the optical information of the interference pattern.

Figure 2:
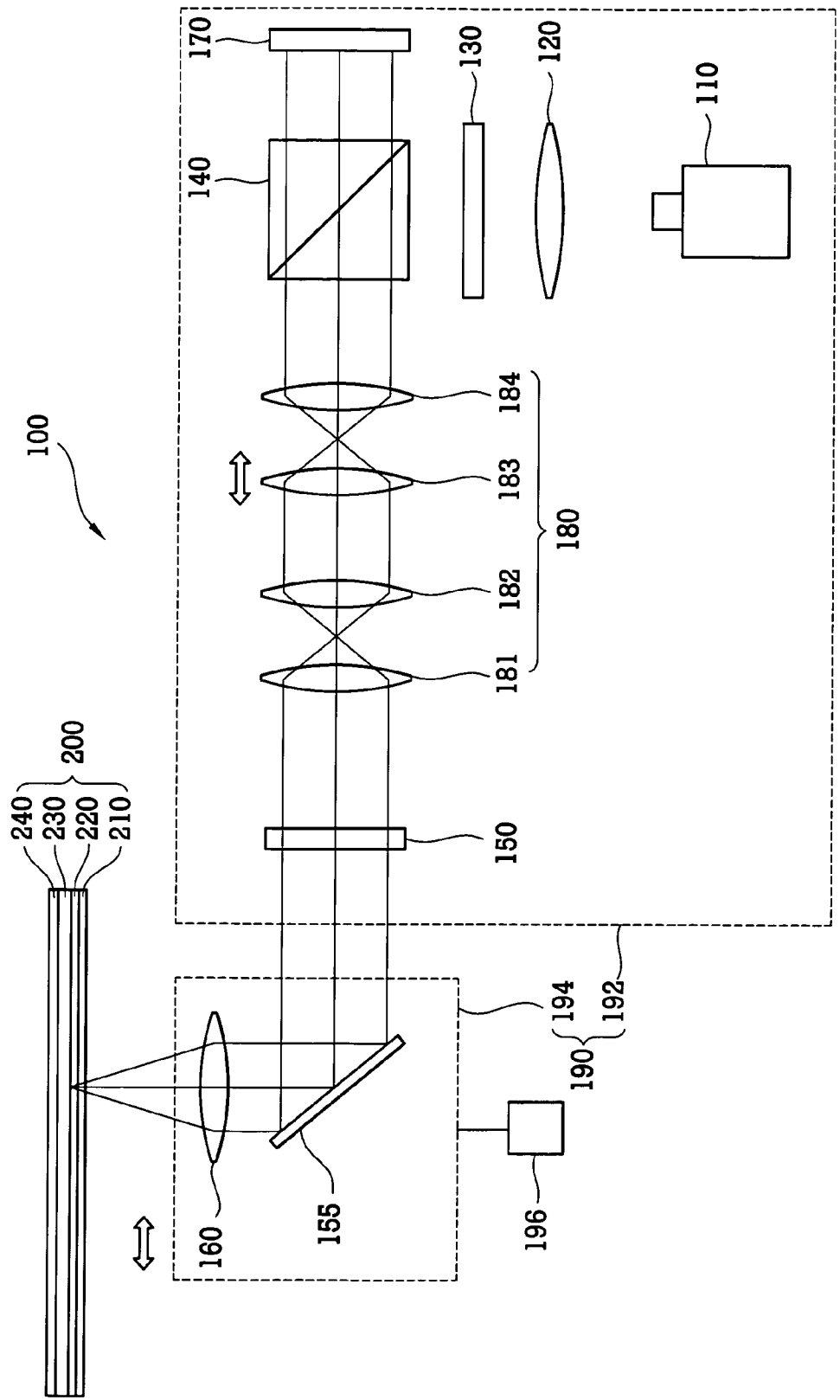
FIG. 2 is a schematic diagram illustrating an optical path for reproducing optical information in the optical information recording and reproducing apparatus.

FIG. 2 is a schematic diagram illustrating an optical path for reproducing optical information in the optical information recording and reproducing apparatus.

Referring to FIG. 2, the reproducing beam has the same polarization as that of the reference beam. Since the reference beam is incident in a circularly polarized state, the reproducing beam is a circularly polarized. The reproducing beam is converted into a parallel beam by passing the objective lens 160, is reflected by the reflecting mirror 155. The reproducing beam is then converted into an S polarized beam by passing the quarter-wavelength plate 150. The S polarized reproducing beam is incident on the optical information detector 170 through the polarizing beam splitter 140.

The configuration described above is only an example of the optical information recording and reproducing apparatus according to the invention, and the invention is not limited to the arrangements or shapes of the elements. In one exemplary embodiment, an additional light source generating a reproducing-specific reference beam may be provided. In another exemplary embodiment, the objective lens is divided into a recording-specific objective lens (a first objective lens) and a reproducing-specific objective lens (a second objective lens), thereby making optical paths of the reference beam and the reproducing beam different each other.

The optical pickup 190 is now described with reference to FIG. 1.

The optical pickup 190 can include a fixed unit 192 and a moving unit 194. The fixed unit 192 can include the light modulator 130 or the optical information detector 170. The moving unit 194 can include the objective lens 160. Elements relatively large and heavy among the elements of the optical pickup 190 can be disposed in the fixed unit 192.

The moving unit 194 can be driven by a driving unit 196 so as to move the objective lens 160 to the predetermined position on the recording medium 200. The driving unit 196 can employ a known unit for driving a pickup in a CD drive or a DVD drive. A distance between the moving unit 194 and the fixed unit 192 varies with movement of the moving unit 194.

The driving unit 196 can vary a distance between the light modulator 130 and the objective lens 160. The driving unit 196 can vary a distance between the optical information detector 170 and the objective lens 160. In one exemplary embodiment, the driving unit 196 may move the moving unit 194. In another exemplary embodiment, the driving unit 196 may directly move the objective lens 160. In still another exemplary embodiment, the driving unit 196 may move the fixed unit 192. In still another exemplary embodiment, the driving unit 196 may move the light modulator 130 or the optical information detector 170. In still another exemplary embodiment, the driving unit 196 may vary the distance between the light modulator 130 and the objective lens 160 or the distance between the optical information detector 170 and the objective lens 160 by moving two or more elements.

The driving unit 196 can independently drive the moving unit 194. Alternatively, the driving unit 196 may independently drive the objective lens 160. The size of the driving unit 196 can be reduced and the moving speed can be enhanced by independently driving only the objective lens 160.

The image adjusting unit 180 can adjust the magnification of a detected image detected by the optical information detector 170. The image adjusting unit 180 can adjust the focus of the detected image detected by the optical information detector 170. The image adjusting unit 180 can adjust the magnification between the output image resulting from the reproducing beam passing through the objective lens 160 and the detected image detected by the optical information detector 170, with a variation in distance between the optical information detector 170 and the objective lens 160. The output image of the objective lens 160 means an image formed at a position corresponding to the focal length $f_0$ of the objective lens 160 from the reproducing beam passing through the objective lens 160. The detected image means an image detected by the optical information detector 170 from the reproducing beam. Although the size of the detected image can vary with the movement of the moving unit 170, the detected image can be kept with constant magnification and focusing by adjusting the magnification and the focus by the image adjusting unit 180.

The image adjusting unit 180 can adjust the magnification between an image at a position of the light modulator 130 and the incident image of the objective lens 160 with the movement of the moving unit 194. The image adjusting unit 180 can adjust the focus of the incident image of the objective lens 160. The image adjusting unit 180 can adjust the magnification between the incident image of the objective lens 160 and the image at the position of the light modulator 130 with the variation in distance between the light modulator 130 and the objective lens 160. The incident image of the objective lens 160 means an image resulting from the information beam at a position corresponding to the focal length $f_0$ of the objective lens 160 before the information beam is incident on the objective lens 160. Accordingly, when the reference beam is same, the incident image and the output image of the objective lens 160 are substantially equal to each other. The light modulator 130 is located at a position corresponding to the focal length $f_4$ of a fourth relay lens 184 (see FIG. 4). Accordingly, the image at the position of the light modulator 130 can be substantially equal to the detected image in magnification and focus.

In one exemplary embodiment, the image adjusting unit 180 is disposed in the optical paths of the information beam and the reproducing beam. In another exemplary embodiment, the image adjusting unit 180 may be separately provided in the optical paths of the information beam and the reproducing beam. For example, when the recording-specific objective lens (the first objective lens) and the reproducing-specific objective lens (the second objective lens) can be provided instead of the objective lens 160 and thus the optical paths of the reference beam and the reproducing beam can be different from each other, a first image adjusting unit can be disposed for the first objective lens and a second image adjusting unit can be disposed for the second objective lens.

The image adjusting unit 180 can be disposed in any one of the moving unit 194 and the fixed unit 192. In one exemplary embodiment, the image adjusting unit 180 can be disposed in the fixed unit 192 in order to reduce the size and weight of the moving unit 914. In another exemplary embodiment, among the optical elements 181, 182, 183, and 184 of the image adjusting unit 180, some optical elements can be disposed in the moving unit 194 and the other optical elements may be disposed in the fixed unit 192.

Hereinafter, an operation of the image adjusting unit 180 will be described with reference to FIGS. 3 to 6. The adjustment of magnification and focus of the detected image resulting from the information beam and the adjustment of magnification and focus of the detected image resulting from the reproduced are equal to each other in the operating principle, and thus only the operation of the image adjusting unit 180 along the optical path of the reproducing beam will be described.

Figure 3:
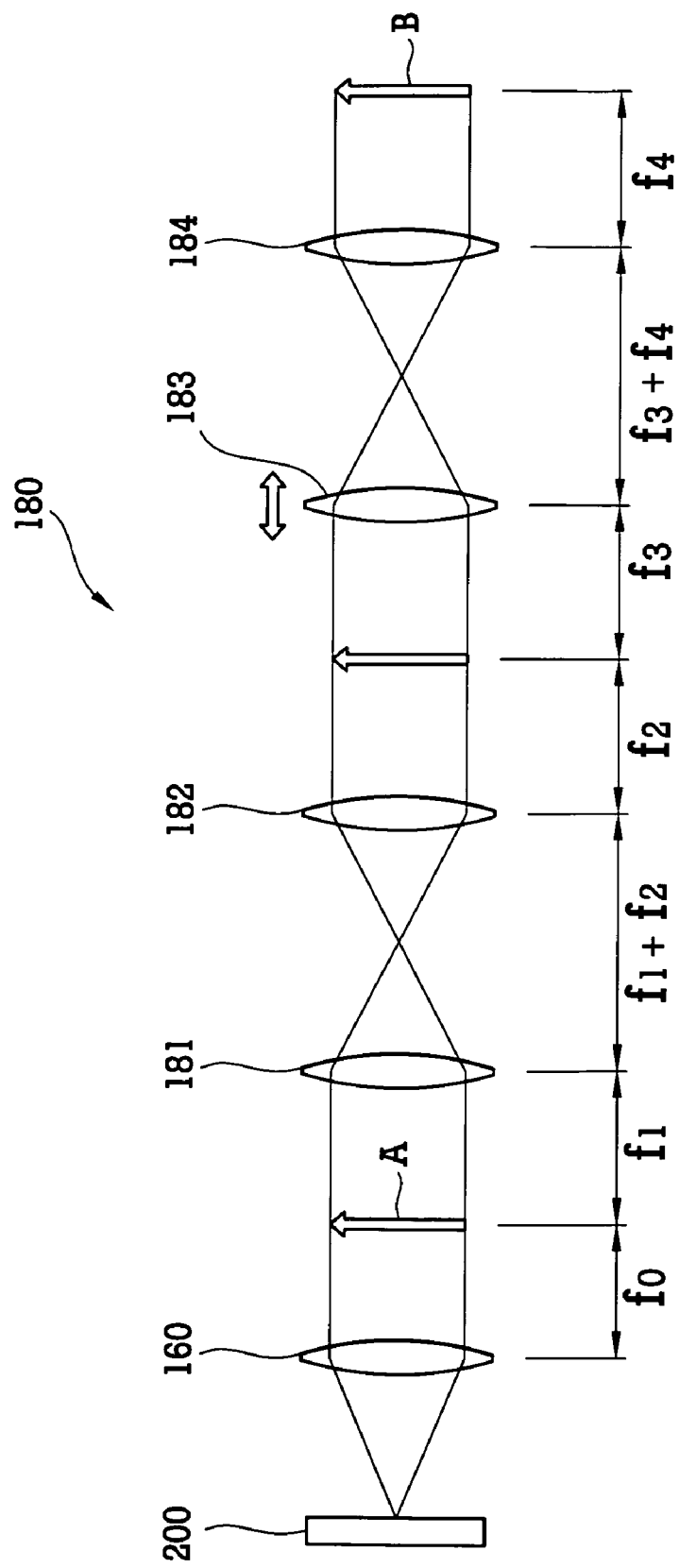
FIG. 3 is a schematic diagram illustrating an arrangement of an image adjusting unit at an origin.

FIG. 3 is a schematic diagram illustrating an arrangement of the image adjusting unit at an origin.

Referring to FIG. 3, the image adjusting unit 180 includes a plurality of relay lenses 181, 182, 183, and 184. The relay lenses 181, 182, 183, and 184 can be convex lenses.

The reproducing beam can be generated from the recording medium 200 and travel to the optical information detector 170 through the objective lens 160. Among the relay lenses in the traveling path of the reproducing beam, the relay lens closes to the objective lens 160 is called the first relay lens 181, and the subsequent relay lenses are sequentially called the second relay lens 182, the third relay lens 183, and the fourth relay lens 184. The first relay lens 181 has a first focal length $f_1$, the second relay lens 182 has a second focal length $f_2$, the third relay lens 183 has a third focal length $f_3$, and the fourth relay lens 184 has a fourth focal length $f_4$.

An output image A is formed at the position corresponding to the focal length $f_0$ of the objective lens 160. The optical information detector 170 is located at the position corresponding to the fourth focal length f4 of the fourth relay lens 184, a detected image B is formed apart from the fourth relay lens 184 by the fourth focal length $f_4$.

The relay lenses 181, 182, 183, and 184 are spaced by the focal lengths at an origin. In this case, the magnification between the first relay lens 181 and the fourth relay lens 184 is 1, and thus the output image A and the detected image B are equal to each other in size (B/A=1).

Figure 4:
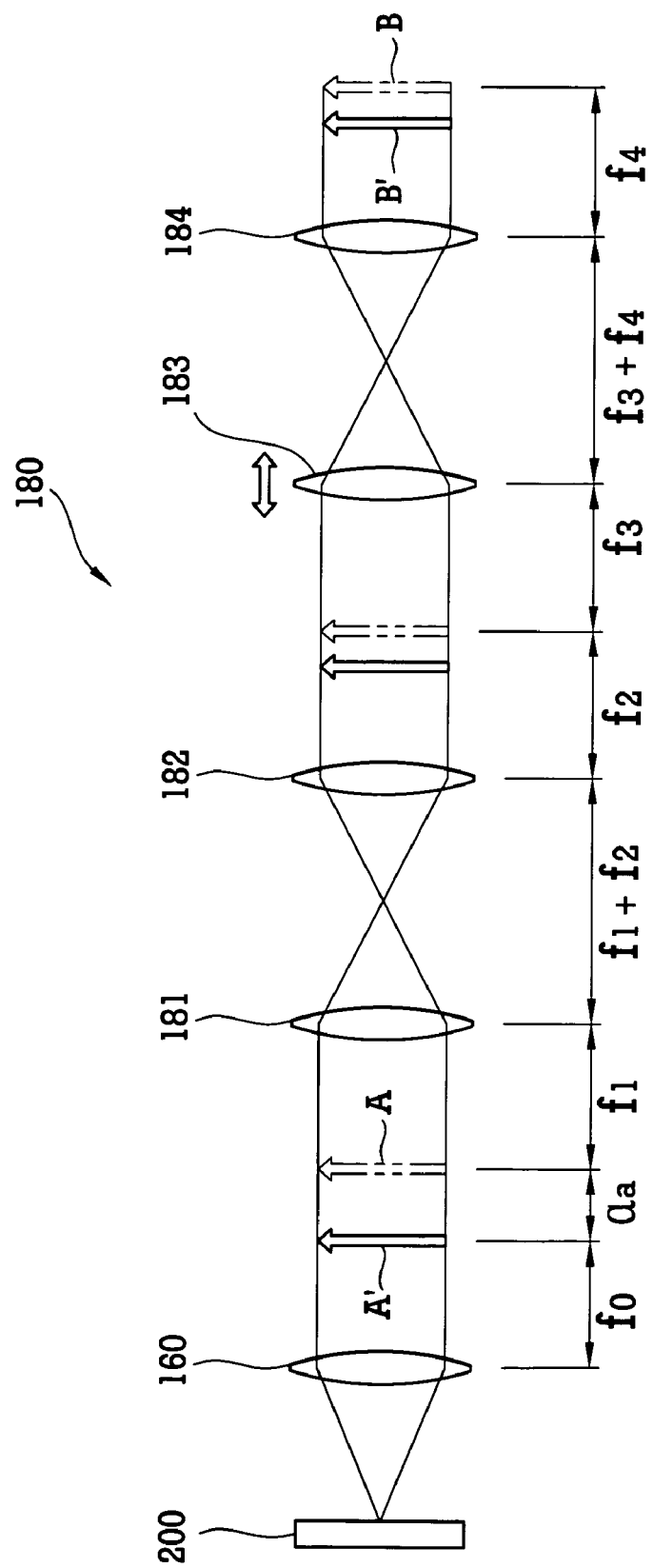
FIG. 4 is a schematic diagram illustrating an arrangement of the image adjusting unit of which the magnification is not yet adjusted when an objective lens is moved.

FIG. 4 is a schematic diagram illustrating an arrangement of the image adjusting unit of which the magnification is not yet adjusted when the objective lens is moved.

Referring to FIG. 4, when the objective lens 160 is moved to a predetermined position, that is, a reproducing position of desired optical information, from the origin by the predetermined distance (a, the distance between the objective lens 160 and the optical information detector 170 is changed. That is, the distance between the objective lens 160 and the first relay lens 181 is changed.

Even when the objective lens 160 is moved, the output image A' is positioned at the position corresponding to the focal length $f_0$ of the objective lens 160. The output image A' is formed apart from the position corresponding to the first focal length f1 of the first relay lens 181 by the distance $\alpha_a$. Thus, the optical information detector 170 is out of focus and thus the detected image B is blurred. The detected image B cannot be accurately reproduce the original optical information without any adjustment of magnification and focus.

Figure 5:
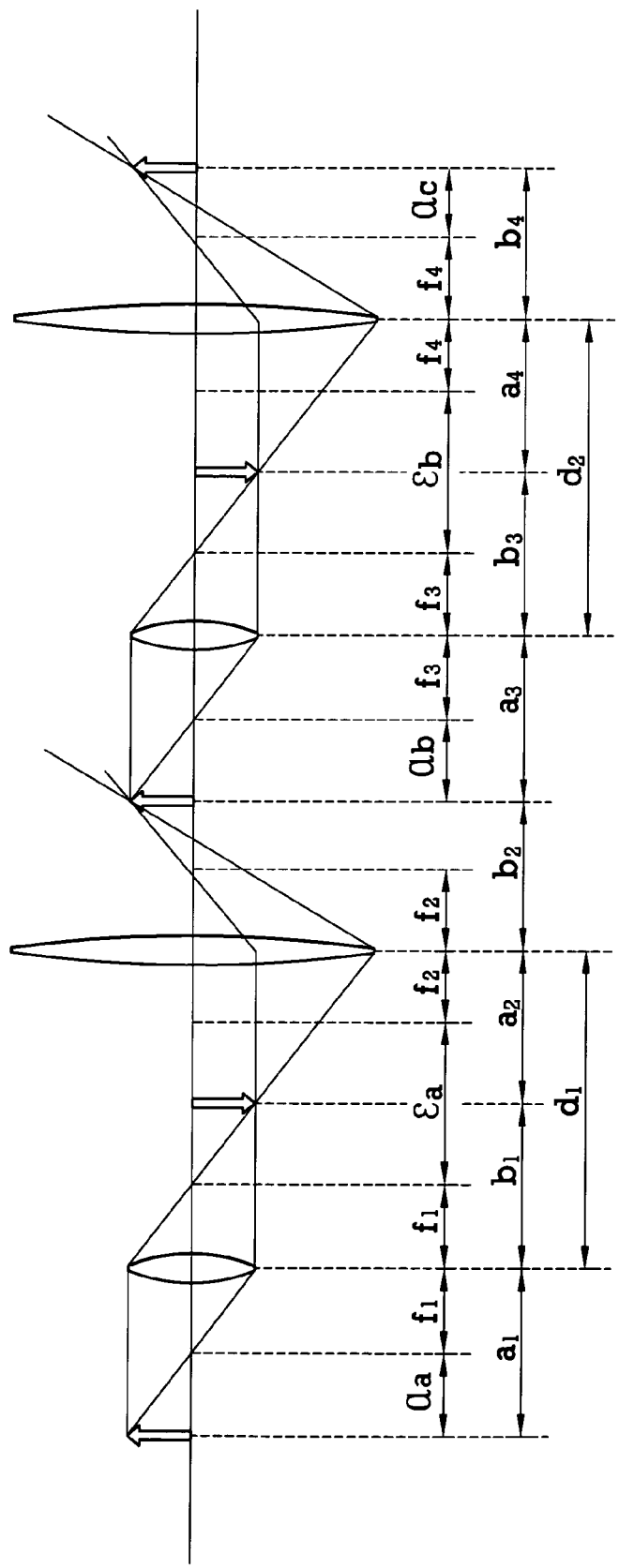
FIG. 5 is a schematic diagram illustrating the principle of the image adjusting unit.

FIG. 5 is a schematic diagram illustrating principle of the image adjusting unit 180.

Referring to FIG. 5, the following relations are established.

$$a_1 = f_1 + \alpha_a$$

$$d_1 = f_1 + f_2 + \epsilon_a$$

$$a_3 = f_3 + \alpha_b$$

$$d_2 = f_3 + f_4 + \epsilon_b$$

Here, $b_1$ can be expressed by Equation 1 using a formula of the first relay lens 181: $1/a_1 + 1/b_1 = 1/f_1$.

$$b_1 = \frac{(f_1 + \alpha_a) f_1}{\alpha_a} \qquad \text{Equation 1}$$

Since $a_2 = d_1 - b_1$, $a_2$ can be expressed by Equation 2.

$$a_2 = \frac{\alpha_a f_2 + \varepsilon_a - f_1^2}{\alpha_a} \qquad \text{Equation 2}$$

$b_2$ can be obtained using $a_2$. That is, since $1/a_2 + 1/b_2 = 1/f_2$, $b_2$ can be expressed by Equation 3.

$$b_2 = f_2 - \frac{\alpha_a f_2^2}{f_1^2 - \varepsilon_a \alpha_a} \qquad \text{Equation 3}$$

In this case, the magnification $m_{12}$ between the first relay lens 181 and the second relay lens 182 can be expressed by Equation 4.

$$m_{12} = -\frac{b_1}{a_1} \cdot \frac{b_2}{a_2} = \frac{f_1 f_2}{\alpha_a \varepsilon_a - f_1^2} \qquad \text{Equation 4}$$

Similarly, $b_4$ and magnification $m_{34}$ between the third relay lens 183 and the fourth relay lens 184 can be expressed by Equations 5 and 6, respectively.

$$b_4 = f_4 - \frac{\alpha_b f_4^2}{f_3^2 - \alpha_b \varepsilon_b} \qquad \text{Equation 5}$$

$$m_{34} = -\frac{b_3}{a_3} \cdot \frac{b_4}{a_4} = \frac{f_3 f_4}{\alpha_b \varepsilon_b - f_3^2} \qquad \text{Equation 6}$$

Since the total magnification m of the image adjusting unit 180 is a magnification product of the first relay lens 181 to the fourth relay lens 184, m can be expressed by Equation 7.

$$m = m_{12} \cdot m_{34} = \frac{f_1 f_2}{\alpha_a \varepsilon_a - f_1^2} \cdot \frac{f_3 f_4}{\alpha_b \varepsilon_b - f_3^2} \qquad \text{Equation 7}$$

The magnification of the detected image can be adjusted based on the Equation 7.

Since $b_4 = f_4 + \alpha_c$, $\alpha_b$ can be obtained from Equation 5 and can be expressed by Equation 8.

$$\alpha_b = \frac{\alpha_c f_3^2}{\alpha_c \varepsilon_b - f_4^2} \qquad \text{Equation 8}$$

By substituting Equation 8 for Equation 7, the magnification m can be expressed by Equation 9 which is a function of $\alpha_c$ and $\varepsilon_a$.

$$m = \frac{f_1 f_2}{\alpha_a \varepsilon_a - f_1^2} \cdot \frac{\alpha_c \varepsilon_b - f_4^2}{f_3 f_4} \qquad \text{Equation 9}$$

In Equation 9, by changing the distance $\varepsilon_a$ between the first relay lens 181 and the second relay lens 182 or the position corresponding to $\alpha_c$ of the fourth relay lens 184, the magnification between the output image and the detected image can be set to a desired value. The magnification can be set in consideration of the size of the optical information detector 170 or the reliability of the detected image.

In Equation 9, m=1 is obtained when Equation 10 is established.

$$\alpha_c = 0, \varepsilon_a = 0, \frac{f_2}{f_1} = \frac{f_3}{f_4} \qquad \text{Equation 10}$$

$\alpha_c = 0$ is achieved when the optical information detector 170 is apart from the fourth relay lens 184 by the fourth focal length $f_4$. $\varepsilon_a = 0$ is achieved when the first relay lens 181 and the second relay lens 182 are apart from each other by $f_1 + f_2$.

By substituting Equation 10 for Equations 3, 4, 5, and 6, respectively, the following relations are obtained.

$$b_2 = f_2 - \alpha_a \left(\frac{f_2}{f_1}\right)^2, m_{12} = -\frac{f_2}{f_1}$$

$$b_4 = f_4 - \alpha_a \left(\frac{f_2 f_4}{f_1 f_3}\right)^2, m_{34} = -\frac{f_4}{f_3}$$

When $b_4$ is not equal to $f_4$, the position of the optical information detector 170 does not correspond to the position in which the image is formed by the fourth relay lens 184 (that is, the optical information detector 17 is out of focus), thereby blurring the image.

In order to correct the focus, the third relay lens 183 can be moved. When the third relay lens 183 is moved by $\alpha_a(f_2/f_1)^2$, $\alpha_b = 0$. By substituting the moved distance for Equations 5 and 6, respectively, the following relation is obtained.

$$b_4 = f_4, m_{34} = -\frac{f_4}{f_3}$$

In this case, the magnification m can be kept with 1 by Equation 9.

Figure 6:
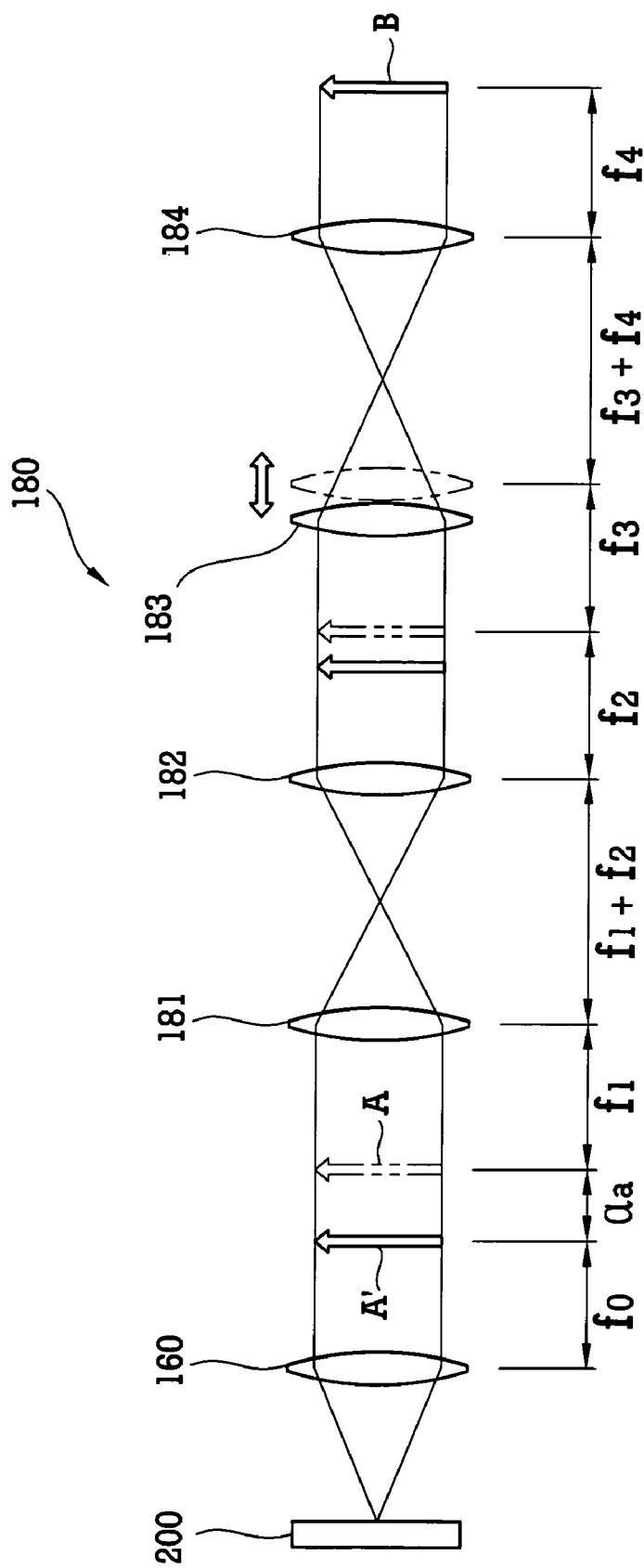
FIG. 6 is a schematic diagram illustrating an arrangement of the image adjusting unit of which the magnification and focus are adjusted.

FIG. 6 is a schematic diagram illustrating an arrangement of the image adjusting unit 180 of which the magnification and focus are adjusted.

Referring to FIG. 6, the arrangement and the focal lengths of the relay lenses 181, 182, 183, and 184 of the image adjusting unit 180 satisfy Equation 9 and the third relay lens 183 is moved by $\alpha_a(f_2/f_1)^2$ to correspond to the moved distance of the objective lens 160. The detected image having constant magnification is accurately formed on the optical information detector 170. Accordingly, even when the objective lens 160 is moved, it is possible to detect an accurate image without moving the optical information detector 170 or the light modulator 130.

The third relay lens 183 can be moved in a direction substantially parallel to the optical path of the reproducing beam or the information beam. A known linear driving unit such as a stepping motor or a rack-and-pinion structure can be used to drive the third relay lens 183.

The moving distance of the third relay lens 183 can be adjusted by adjusting a ratio of the first focal length $f_1$ and the second focal length $f_2$. Accordingly, the movement speed of the third relay lens 183 can be selected.

By determining the ratio of the first focal length $f_1$ and the second focal length $f_2$ and then determining the ratio of the third focal length $f_3$ and the fourth focal length $f_4$, it is possible to adjust the magnification of the detected image. For example, when $f_2/f_1 = f_3/f_4$, the magnification is 1.

In the optical pickup 190, it is possible to move only the objective lens 160 by the use of the image adjusting unit 180 and to fix the other large and heavy optical elements. That is, the optical pickup can be easily divided into the moving unit and the fixed unit. Since the number of moving elements of the optical pickup 190 can be reduced and the optical pickup 190 can be moved at a high speed, it is possible to enhance a data processing rate.

Although the invention has been described with reference to the exemplary embodiments, it will be understood by those skilled in the art that the invention can be modified in various forms without departing from the technical spirit and scope of the invention. The invention is not limited to the configuration and arrangement of the image adjusting unit 180, but may be modified in various forms. For example, the number of the relay lenses may be more or less than four.

Although a uniaxial type optical information recording and reproducing apparatus in which the reference beam and the information beam are coaxial with each other has been described, the technical spirit of the invention may be applied to a biaxial type optical information recording and reproducing apparatus in which the optical paths of the reference beam and the information are separated from each other. That is, the beam emitted from the light source may be divided directly into the reference beam and the information beam. In this case, the information beam may be irradiated to the recording medium through the objective lens, and the reference beam may be irradiated to the recording medium without passing through the objective lens.

When the light modulator of the optical information recording and reproducing apparatus generates only the reference beam, the light modulator serves as a reference beam generator and the optical information recording and reproducing apparatus serves as an optical information reproducing apparatus. Alternatively, when the optical information detector or the optical information detecting function is removed from the optical information recording and reproducing apparatus, the optical information recording and reproducing apparatus serves as an optical information recording apparatus. Therefore, the technical spirit of the invention can be applied to the optical information reproducing apparatus and the optical information recording apparatus without any change.

As described above, according to the present invention, it is possible to decrease the size and weight of the optical pickup by reducing the number of moving elements, thereby controlling the optical pickup at a high speed and with high precision. It is possible to decrease the size or weight of the optical information processing apparatus, thereby securing reliability in recording and reproducing optical information.

What is claimed is:

1. A holographic optical information reproducing apparatus comprising:
    an objective lens configured to irradiate a reference beam to a predetermined position on a recording medium and configured to receive a reproducing beam reproduced from the recording medium;
    an optical information detector configured to detect the reproducing beam passing through the objective lens;
    a driving unit configured to change a distance between the optical information detector and the objective lens; and
    an image adjusting unit comprising four relay lenses and being disposed in an optical path of the reproducing beam, the image adjusting unit configured to adjust a magnification and a focus of an image by moving one of the four relay lenses, the image accurately being formed between an output image resulting from the reproducing beam passing through the objective lens and a detected image detected by the optical information detector with variation in distance to a predetermined position between the optical information detector and the objective lens despite a movement of the optical information detector and the objective lens by the driving unit, wherein a moving lens of the four relay lenses locates between one of the four relay lenses located at the most adjacent to the optical information detector and a relay lens located at the most adjacent to the objective lens, and wherein the four relays lenses are convex lenses.

2. An optical information reproducing apparatus having an optical pickup irradiating a reference beam to a recording medium and detecting a reproducing beam reproduced from the recording medium, the optical pickup comprising:
    a moving unit having an objective lens configured to move the objective lens to a predetermined position on the recording medium and configured to irradiate the reference beam to the recording medium;
    a fixed unit having an optical information detector configured to detect the reproducing beam; and
    an image adjusting unit being disposed in the fixed unit and comprising four relay lenses disposed in an optical path of the reproducing beam, the image adjusting unit configured to adjust magnification and a focus of an image by moving one of the four relay lenses, the image accurately being formed between an incident image of the objective lens and a detected image detected by the optical information detector with variation in distance to a predetermined position between the optical information detector and the objective lens in order to maintain a constant magnification of the detected image to detect an accurate image despite the objective lens' moving by the moving unit, wherein the moving lens of the four relay lenses locates between one of the four relay lenses located at the most adjacent to the optical information detector and a relay lens located at the most adjacent to the objective lens, and wherein the four relay lenses are convex lenses.

3. A holographic optical information recording apparatus for recording an interference pattern of a reference beam and an information beam in a recording medium, the apparatus comprising:
    means for emitting light;
    means for generating the information beam;
    means for generating the reference beam;
    means for irradiating the information beam to a predetermined position on a recording medium; and
    means for changing a distance between an information beam generator and an objective lens, wherein
    an image adjusting unit comprising four convex relay lenses and being disposed within a fixed unit configured to adjust magnification and to focus an image accurately being formed between an incident image of the objective lens and an image at a position of the information beam generator with variation in distance to a predetermined position between the information beam generator and the objective lens despite changing in distance between the information beam generator and the objective lens, and wherein the objective lens comprises a first objective lens to irradiate the information beam to the recording medium and a second objective lens to receive a reproducing beam from the recording medium.

4. A holographic optical information recording apparatus according to claim 3, wherein the image adjusting unit includes four relay lenses disposed in an optical path of the information beam, and the image adjusting unit adjusts the magnification and focus by moving one of the four relay lenses.

5. A holographic optical information recording apparatus according to claim 4, wherein the relay lens located at the most adjacent to the optical information detector among the four relay lenses is fixed and the optical information detector is located at a position corresponding to the focal length of the four relay lens.

6. A holographic optical information recording apparatus according to claim 5, wherein the information beam generator can be integrated with a reference beam generator.

7. A holographic optical information recording apparatus according to claim 5, wherein a moving lens of the four relay lenses locates between one of the four relay lenses located at the most adjacent to the information beam generator and a relay lens located at the most adjacent to the objective lens.

8. A holographic optical information recording apparatus according to claim 7, wherein the four relay lenses are convex lenses.

9. An optical pickup comprising:
    a moving unit having an objective lens configured to irradiate information beam to the recording medium, wherein the objective lens comprises a first objective lens to irradiate the information beam to the recording medium and a second objective lens to receive a reproducing beam from the recording medium; and
    a fixed unit having an information beam generator configured to generate the information beam,
    wherein an image adjusting unit comprising four convex relay lenses is disposed in the fixed unit and is configured to accurately form a detected image having constant magnification by adjusting magnification and focusing the detected image formed between at a position of the information beam generator and an incident image of the objective lens with variation in distance to a predetermined position between the optical information detector and the objective lens.

10. A method comprising:

dividing an optical pickup into a moving unit having at least an objective lens and a fixed unit having at least an optical information detector for recording and reproducing optical information associated with information beam and reference beam, wherein the objective lens comprises a first objective lens to irradiate the information beam to a recording medium and a second objective lens to receive a reproducing beam from the recording medium; and forming an image adjusting unit comprising four convex relay lenses and being disposed within the fixed unit for adjusting magnification and focusing an image accurately being formed between an incident image of the objective lens and a detected image formed on the optical information detector by maintaining a constant magnification with variation in distance to a predetermined position between the optical information detector and the objective lens despite fast moving of the objective lens while recording and reproducing the optical information.

11. A method according to claim 10, wherein the relay lens locates at the most adjacent to the optical information detector among the relay lenses is fixed and the optical information detector locates at a position corresponding to the focal length of the fixed relay lens.

* * * * *